March 28, 1944. H. J. MURPHY 2,344,948
ROTARY FASTENER AND INSTALLATION THEREOF
Filed May 12, 1942 2 Sheets-Sheet 1

Inventor:
Howard J. Murphy
by Walter S. Jones
Att'y.

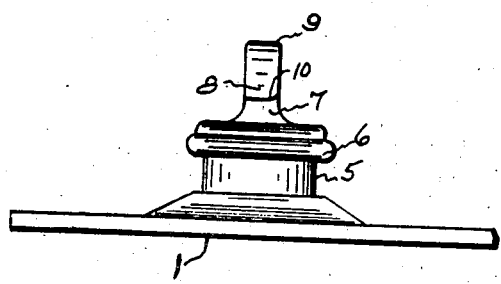
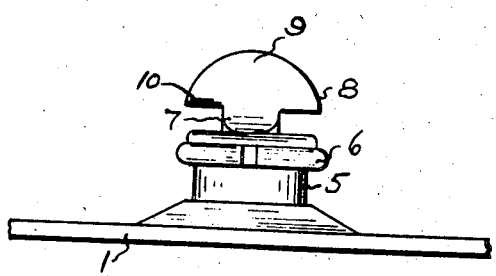
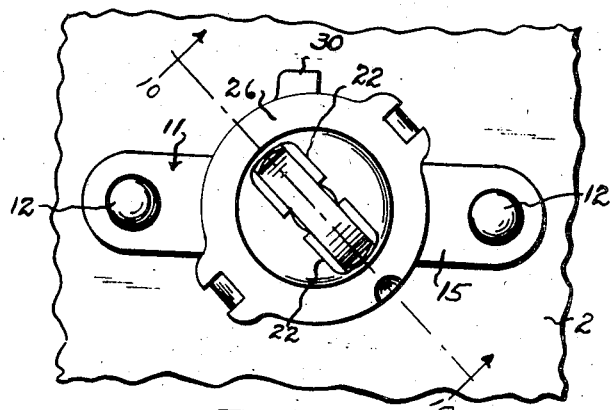
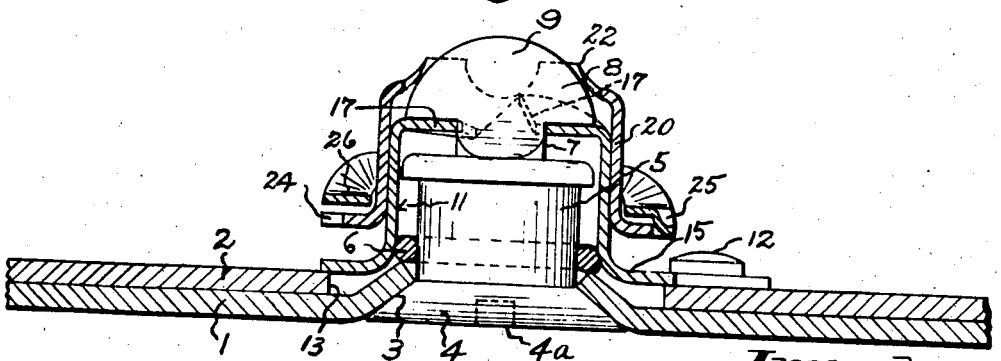

Patented Mar. 28, 1944

2,344,948

UNITED STATES PATENT OFFICE 2,344,948

ROTARY FASTENER AND INSTALLATION THEREOF

Howard J. Murphy, Greenwood, Mass., assignor to United-Carr Fastener Corporation, Cambridge, Mass., a corporation of Massachusetts Application May 12, 1942, Serial No. 442,602

13 Claims. (Cl. 24—221)

The present invention relates to fasteners for securing together two plates or sheet-like parts, such as airplane cowling and the like, and aims generally to improve existing fasteners for that purpose.

The fastener of the present invention is of the rotary stud type, particularly designed for, though not exclusively limited to, use for rigidly fastening airplane cowling in flush-tight relationship. In prior fasteners of this type the rotary stud usually cooperates with cam means on the socket member for effecting tight clamping engagement between the parts. The extreme pressures to which the cooperating stud and cam parts are subjected in airplane use, together with the vibrations usually present, present a tendency for the stud to be rotated in an unlocking direction.

The present invention aims to provide an improved cowl fastener of the rotary stud type, which can be simply rotated to a locked position on a cam and held against accidental unlocking by additional locking means.

In the drawings which illustrate one preferred embodiment of the invention:

Fig. 7 is an edge elevation of the stud member;

Fig. 8 is a side elevation thereof;

Fig. 9 is a top plan view similar to Fig. 1, of the assembled socket and stud, the latter being in locked position; and Fig. 10 is an enlarged vertical sectional view taken on the line 10—10 of Fig. 9.

Figure 1:
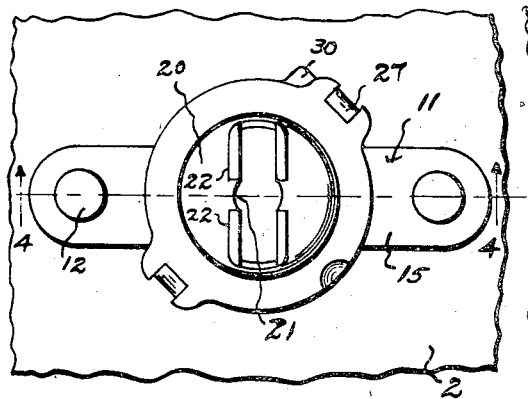
Fig. 1 is a top plan view of the socket member and a portion of its attached plate.
Figure 2:
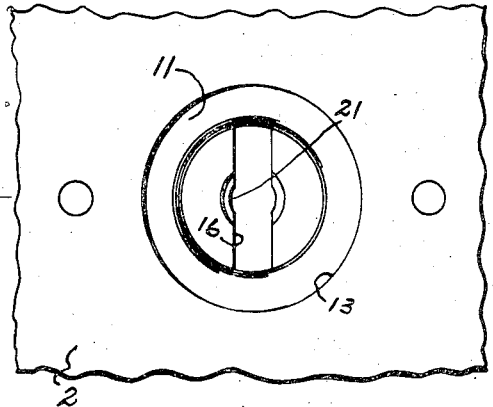
Fig. 2 is a bottom plan view thereof.
Figure 3:
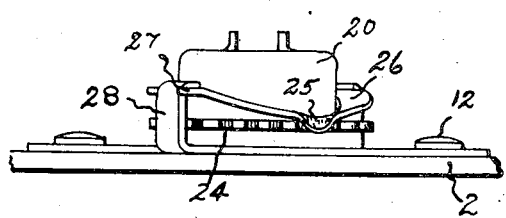
Fig. 3 is a side elevation of the socket member.
Figure 4:
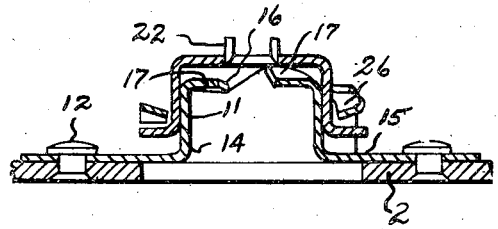
Fig. 4 is a vertical section taken on the line 4—4 of Fig. 1.

Referring to the embodiment of the invention illustrated, the cooperative stud and socket members of the fastener are attached respectively to supporting members 1 and 2 such as cowling sheets adapted to be secured together in flush-tight relationship.

The supporting member 1 is formed with an opening 3, preferably countersunk as shown in Fig. 10, to receive a tapered head 4 of an elongated stud shank 5 rotatable in said opening, the shank 5 being considerably longer than the thickness of the member 1 so that the stud may be rotatable as well as axially movable in the aperture 3. A split locking ring 6 on the shank 5 at the end opposite the head 4 prevents removal of the stud from the member 1.

The inner end of the stud may be provided with a locking head comprising a reduced neck 7 and laterally extending radial arms or shoulders 8 of a length approximately equal to the diameter of the shank but of a reduced width relative thereto, said arms or shoulders 8 presenting laterally extending portions adapted for locking engagement upon surfaces of a female socket member. The stud preferably is formed with a flat-sided nose 9 beyond the shoulders 8 for the purpose hereinafter described. The underside faces of said shoulders 8 may be inclined as at 10 to provide cams to facilitate movement of the shoulders over the cooperating surface of the socket member, and the head 4 of the stud may be slotted or otherwise shaped as at 4ᵃ for rotating the stud.

The socket member 11 is attached, as by suitable fastening means 12, to the other supporting member or sheet 2 to cover a stud-receiving opening 13 in said member. Preferably, the stud-receiving aperture is of a size to receive the inwardly extending countersunk faces of the member 1 (see Fig. 10), and the socket member may be rigidly attached to the sheet 2 so as to cover the opening.

The socket or female fastening member 11 is preferably formed of thin hardened metal, such as steel, and is drawn to provide a tubular stud-receiving barrel 14 of a diameter and depth to receive the stud, the base portion 15 of said socket overlying the surface of the member 2 for receiving the fastening means 12. The outer wall of the barrel portion 14 is formed with an elongated aperture 16 to admit the locking head of the stud, the marginal edges of said aperture being dished outwardly on opposite sides thereof to form locking cams 17 for cooperating locking engagement with the shoulders 8 as the stud is rotated. In this position the flat-sided nose 9 of the stud as well as at least a portion of the shoulders 8 are disposed outwardly of the member 11, as shown in Fig. 10.

According to the invention, means are provided for positively holding the stud in its locked position to prevent retrograde movement on the cams 17 when subjected to pressure and vibration. In the illustrated form of the invention shown herein a locking cap 20 of drawn metal, such as steel, is fitted over the socket member 11, the outer wall of which is provided with an elongated aperture 21 to receive the flat-sided nose 9 and a portion of the shoulders 8, the opposed longitudinal marginal edges of the slot being formed with flat marginal faces or flanges 22 engaging the flat side faces of nose 9 or shoulders 8.

Figure 5:
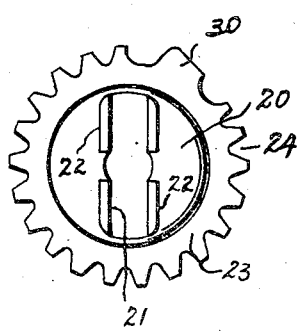
Fig. 5 is a plan view of the locking cap.
Figure 6:
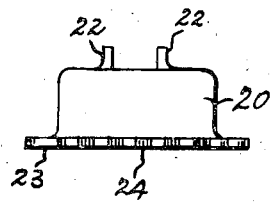
Fig. 6 is a side view thereof.

The opposite open end of the cap may be formed with a laterally projecting flange or rim 23 serrated or otherwise formed along its periphery to provide a series of detent-engaging recesses or notches 24 (see Fig. 5) adapted to be engaged by a suitable fixedly mounted detent 25, which conveniently may be formed on an annular member 26 surrounding the cap and supported as at 27 on diametrically opposed posts 28 on the socket base 15, in such a way that the ring member 26 cannot rotate relatively to the socket member. The ring member 26 preferably is formed of spring metal so that the detent 25 will ride over the notches when the stud is deliberately rotated as by a tool inserted in the slot 4ª, but is of sufficient rigidity to prevent accidental rotation of the stud and cap when subject to vibration.

In use, when the supporting members 1 and 2 are assembled together, the stud member 5 is moved axially in the socket 11 so that the flat-sided nose 9 and shoulders 8 extend through the aperture 16 and above the cams 17. In this position the flanges 22, defining the elongated opening in the cap 20, are aligned with the longitudinal sides of the opening 16 so that they receive and engage the flat side faces of the nose 9. The stud 5 may then be rotated by means of a tool inserted in the slot in the stud head, such rotation moving the shoulders 8 across the cam 17 of the socket and clamping the members 1 and 2 together under considerable pressure. Such rotation of the stud also causes rotation of the cap 20 relative to the socket 11 and the detents 25. When rotated to any selected position, the engagement of the detents 25 in the notches of the cap flange 24 prevent accidental rotation of the cap, and, of course, the stud as the flanges of the cap engage the faces of the stud nose 9.

To insure accurate positioning of the flanges 22 of the cap which define the elongated slot 21 therein in registry with the elongated slot 16 of the socket members, the cap may be provided with a finger 30 movable between the opposed posts 28, thus limiting rotation of the cap relative to the socket 11.

Although I have illustrated and described a preferred embodiment of my invention, I do not wish to be limited thereby because the scope of my invention is best defined by the following claims.

I claim:

1. In a rotary fastener, in combination with a stud member formed with laterally projecting arms and rotatably mounted in one of the members to be supported; of a female fastening member mounted on another member to be supported and formed with an elongated opening to permit passage of the projecting arms of said stud, the marginal side portions of said opening affording arm-engaging surfaces to receive said arms upon rotation of said stud, a cap member mounted on said female fastening member and engaging a portion of said stud to be rotatable therewith, and means fixedly mounted with reference to said female fastening members for engaging said cap member for holding said stud against accidental rotation.

2. In a rotary fastener, in combination with a stud member formed with laterally projecting arms and rotatably mounted in one of the members to be supported; of a barrel-shaped female fastening member mounted on another member to be supported and formed with an elongated opening to permit passage of the projecting arms of said stud, the marginal side portions of said opening affording arm-engaging surfaces to receive said arms upon rotation of said stud, a cap member mounted on said female fastening member and engaging a portion of said stud to be rotatable therewith, and means fixedly mounted with reference to said female fastening member for engaging said cap member for holding said stud against accidental rotation.

3. In a rotary fastener, in combination with a stud member formed with laterally projecting arms and rotatably mounted in one of the members to be supported; of a female fastening member mounted on another member to be supported and formed with an elongated opening to permit passage of the projecting arms of said stud, the marginal side portions of said opening affording arm-engaging surfaces to receive said arms upon rotation of said stud, a cap member mounted on said female fastening member and engaging a portion of said stud to be rotatable therewith, and fixedly mounted detent means with reference to said female fastening member for engaging said cap member for holding said stud against accidental rotation.

4. In a rotary fastener, in combination with a stud member formed with laterally projecting arms and rotatably mounted in one of the members to be supported; of a female fastening member mounted on another member to be supported and formed with an elongated opening to permit passage of the projecting arms of said stud, the marginal side portions of said opening affording arm-engaging surfaces to receive said arms upon rotation of said stud, a cap member mounted on said female fastening member and formed with an elongated opening adapted to register with the opening of said socket member and to receive a portion of said projecting arms, and means fixedly mounted with reference to said female fastening member for engaging said cap member for holding said stud against accidental rotation.

5. In a rotary fastener, in combination with a stud member formed with laterally projecting arms and rotatably mounted in one of the members to be supported; of a substantially rigid female fastening member fixedly mounted on another member to be supported and formed with an elongated opening to permit passage of the projecting arm of said stud, the marginal side portions of said opening affording arm-engaging surfaces to receive said arms upon rotation of said stud, a cap member mounted on said female fastening member and engaging a portion of said stud to be rotatable therewith, and means fixedly mounted with reference to said female fastening member for engaging said cap member for holding said stud against accidental rotation.

6. In a rotary fastener, in combination with a stud member formed with laterally projecting arms and rotatably mounted in one of the members to be supported; of a female fastening member mounted on another member to be supported and formed with an elongated opening to permit passage of the projecting arm of said stud, the marginal side portions of said opening affording arm-engaging surfaces to receive said arms upon rotation of said stud, a cap member mounted on said female fastening member and engaging a portion of said stud to be rotatable therewith, a series of notches formed on said cap member, and fixedly mounted detent means engageable in said notches in selected rotary positions of said cap and stud for holding said stud against accidental rotation.

7. In a rotary fastener, in combination with a stud member formed with laterally projecting arms and a non-circular nose having at least two flat sides, said stud member being rotatably mounted in one of the parts to be supported; of a socket member attached to another part to be supported and formed with an elongated opening to admit the laterally projecting arms of said stud, a cap member rotatably mounted on said socket member and formed with a non-circular opening to receive and engage said stud nose, and locking means fixedly mounted with reference to said socket member and engaging said cap member for preventing accidental rotation of said cap and stud.

8. In a rotary fastener, in combination with a stud member formed with laterally projecting arms and a non-circular nose having at least two flat sides, said stud member being rotatably mounted in one of the parts to be supported; of a substantially cylindrical socket member attached to another part to be supported and formed with an elongated opening to admit the laterally projecting arms of said stud, a cap member rotatably mounted on said socket member and formed with a non-circular opening to receive and engage said stud nose, and locking means fixedly mounted with reference to said socket member and engaging said cap member for preventing accidental rotation of said cap and stud.

9. In a rotary fastener, in combination with a stud member formed with laterally projecting arms and a non-circular nose having at least two flat sides, said stud member being rotatably mounted in one of the parts to be supported; of a substantially cylindrical socket member attached to another part to be supported and formed with an elongated opening to admit the laterally projecting arms of said stud, a cap member rotatably mounted on said socket member and formed with a non-circular opening to receive and engage said stud nose, an outwardly extending rim on said cap member formed with an annular series of notches, and detent means fixedly mounted with reference to said socket member engaging in said notches.

10. In a rotary fastener, in combination with a stud member formed with laterally projecting arms and a non-circular nose having at least two flat sides, said stud member being rotatably mounted in one of the parts to be supported; of a substantially cylindrical socket member attached to another part to be supported and formed with an elongated opening to admit the laterally projecting arms of said stud, a cap member rotatably mounted on said socket member and formed with a non-circular opening to receive and engage said stud nose, an outwardly extending rim on said cap member formed with an annular series of notches, an annular member surrounding said cap member and fixedly mounted with reference to said socket member, and detent means on said annular member engaging in said notches.

11. In a rotary fastener, in combination with a stud member formed with laterally projecting arms and a non-circular nose having at least two flat sides, said stud member being rotatably mounted in one of the parts to be supported; of a substantially cylindrical socket member attached to another part to be supported and formed with an elongated opening to admit the laterally projecting arms of said stud, a cap member rotatably mounted on said socket member and formed with a non-circular opening to receive and engage said stud nose, an outwardly extending rim on said cap member formed with an annular series of notches, an annular member surrounding said cap member and fixedly mounted with reference to said socket member, and detent means on said annular member engaging in said notches, and means limiting rotative movements of said stud and cap member.

12. In a rotary fastener, in combination with a stud member formed with laterally projecting arms and a non-circular nose having at least two flat sides, said stud member being rotatably mounted in one of the parts to be supported; of a socket member attached to another part to be supported and formed with an elongated opening to admit the laterally projecting arms of said stud, the marginal side portions of said opening being formed as outwardly sloping cams for receiving the projecting arms of said stud on rotation thereof, a cap member rotatably mounted on said socket member and formed with a non-circular opening to receive and engage said stud nose, and locking means fixedly mounted with reference to said socket member and engaging said cap member for preventing accidental rotation of said cap and stud.

13. In a rotary fastener, in combination with a stud member formed with laterally projecting arms and a non-circular nose having at least two flat sides, said stud member being rotatably mounted in one of the parts to be supported; of a socket member attached to another part to be supported and formed with an elongated opening to admit the laterally projecting arms of said stud, a cap member rotatably mounted on said socket member and formed with a non-circular opening to receive and engage said stud nose, stud-engaging means on said cap member for engaging and locking the stud and cap members rotatively, and locking means fixedly mounted with reference to said socket member and engaging said cap member for preventing accidental rotation of said cap and stud.

HOWARD J. MURPHY.